US012736662B2

(12) United States Patent
Becker

(10) Patent No.: US 12,736,662 B2
(45) Date of Patent: Sep. 15, 2026

(54) RADAR DATA DETERMINATION CIRCUITRY AND RADAR DATA DETERMINATION METHOD FOR DETERMINING ACTUAL RADAR BASED ON PREDICTIVE RADAR DATA

(71) Applicant: Sony Group Corporation, Tokyo (JP)

(72) Inventor: Florian Becker, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 858 days.

(21) Appl. No.: 17/696,881

(22) Filed: Mar. 17, 2022

(65) Prior Publication Data

US 2022/0308200 A1 Sep. 29, 2022

(30) Foreign Application Priority Data

Mar. 24, 2021 (EP) .................................... 21164683

(51) Int. Cl.

*G01S 13/86* (2006.01)
*G01S 13/931* (2020.01)
*G06N 3/08* (2023.01)
*G06V 10/80* (2022.01)

(52) U.S. Cl.

CPC .......... *G01S 13/867* (2013.01); *G01S 13/931* (2013.01); *G06N 3/08* (2013.01); *G06V 10/806* (2022.01)

(58) Field of Classification Search

CPC ... G01S 13/867; G01S 13/931; G06V 10/806; G06V 10/80; G06N 3/08

See application file for complete search history.

(56) References Cited

U.S. PATENT DOCUMENTS 11,586,854 B2 * 2/2023 Ahuja .................. G05D 1/0088
2017/0242117 A1 8/2017 Izzat et al.
2019/0391254 A1 12/2019 Asghar et al.
2020/0175315 A1 6/2020 Gowaikar et al.
2021/0165093 A1 * 6/2021 Komorkiewicz ......... G06T 7/11
2021/0295113 A1 * 9/2021 Sless ....................... G06F 18/25

FOREIGN PATENT DOCUMENTS

CN 109543601 A 3/2019
DE 102017220243 B3 * 2/2019
EP 3690727 A1 8/2020
JP 2021165914 A * 10/2021 ........ B60W 30/0956
KR 20170134508 A * 12/2017
WO WO-2018202552 A1 11/2018

OTHER PUBLICATIONS

Nabati et al., "CenterFusion: Center-based Radar and Camera Fusion for 3D Object Detection," Jan. 2021, 2021 IEEE Winter Conference on Applications of Computer Vision (WACV), pp. 1526-1535. (Year: 2021).*

(Continued)

*Primary Examiner* — Yuqing Xiao
(74) *Attorney, Agent, or Firm* — XSENSUS LLP

(57) ABSTRACT

Radar data determination circuitry configured to obtain image data; and determine predictive radar data from the image data based on learned features being represented in the image data for determining actual radar data based on an association of the predictive radar data with radar measurement data.

20 Claims, 10 Drawing Sheets

(56) References Cited

OTHER PUBLICATIONS

Aziz et al., "Radar-camera Fusion for Road Target Classification, " Sep. 2020, 2020 IEEE Radar Conference, 6 pages. (Year: 2020).*
Kumar et al., "LiDAR and Camera Fusion Approach for Object Distance Estimation in Self-Driving Vehicles", Symmetry, vol. 12, No. 324, 2020, pp. 1-23.
Lim et al., "Radar and Camera Early Fusion for Vehicle Detection in Advanced Driver Assistance Systems", Machine Learning for Autonomous Driving Workshop at the 33rd Conference on Neural Information Processing Systems (NeurIPS 2019), 11 pages.
Dimitrievski et al., "Cooperative Multi-Sensor Tracking of Vulnerable Road Users in the Presence of Missing Detections", Sensors, vol. 20, No. 4817, 2020, pp. 1-40.

* cited by examiner

RADAR DATA DETERMINATION CIRCUITRY AND RADAR DATA DETERMINATION METHOD FOR DETERMINING ACTUAL RADAR BASED ON PREDICTIVE RADAR DATA

CROSS-REFERENCE TO RELATED APPLICATION

The present application claims priority to European Patent Application No. 21164683.1, filed Mar. 24, 2021, the entire contents of which are incorporated herein by reference.

TECHNICAL FIELD

The present disclosure generally pertains to radar data determination circuitry and a radar data determination method.

TECHNICAL BACKGROUND

Autonomous vehicles or manned vehicles with driver-assistance systems may need to have a rough understanding of an environment. However, one sensor may be insufficient to fulfill a precision or accuracy requirement of a given task (e.g., autonomous driving), such that data from different sensors may be combined, such that an object detection may be carried out while driving autonomously or semi-autonomously.

Known object detection methods, e.g., in automotive environments, may use data from an RGB camera and/or a radar detector.

In the camera domain, objects may be detected based on object detection methods, whereas in the radar domain, distances (to the objects) may be determined.

The objects may be associated with the distances, such that driving safety (e.g. for autonomous driving) may be provided.

Although there exist techniques for detecting objects based on radar and camera data, it is generally desirable to provide radar data determination circuitry and a radar data determination method.

SUMMARY

According to a first aspect, the disclosure provides radar data determination circuitry, configured to:

obtain image data; and determine predictive radar data from the image data based on learned features being represented in the image data, for determining actual radar data based on an association of the predictive radar data with radar measurement data.

According to a second aspect, the disclosure provides a radar data determination method, comprising:

obtaining image data; and determining predictive radar data from the image data based on learned features being represented in the image data, for determining actual radar data based on an association of the predictive radar data with radar measurement data.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
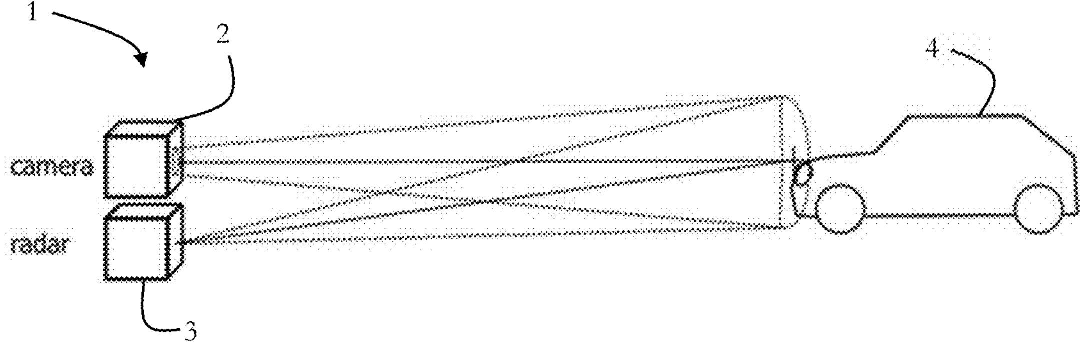
FIG. 1 shows a schematic illustration of radar data determination circuitry according to the present disclosure.

Before a detailed description of the embodiments starting with FIG. 1 is given, general explanations are made.

As mentioned in the outset, object detection methods for detecting objects based on radar data and camera data are generally known.

However, it may be challenging to associate radar detections (which mark positions of strong radar reflectors) with pixels (i.e., positions) in the camera plane. For example, ambiguities may be present since the radar may have a lower resolution than the camera with respect to a horizontal angle (azimuth) and the vertical angle (altitude). Thus, one radar detection projected into the camera plane could correspond to many pixels of the camera.

Known systems may fuse information after performing an amount of sensor-specific processing independently, such that potentially valuable information may be discarded. Thus, it has been recognized that a sensor fusion at an earlier stage only or in addition to a later fusion step may enable a processing pipeline to improve overall performance and may allow useful data from other sensors to be further incorporated.

Hence, it has been recognized that a distance and radial velocity of a radar with pixel-wise information of a camera including angular position, semantic labels, color, and/or object bounding boxes may be fused, such that further information may be added to an image based on a fusion with radar data.

It has further been recognized that it is desirable to provide a machine learning-based approach for predicting radar reflections based on a camera frame, such that the above-mentioned ambiguity may be reduced or even resolved, thereby improving an accuracy and a reliability of data fusion.

Therefore, some embodiments pertain to radar data determination circuitry, configured to: obtain image data; and determine predictive radar data from the image data based on learned features being represented in the image data, for determining actual radar data based on an association of the predictive radar data with radar measurement data.

Circuitry may include any entity or multitude of entities suitable for data processing according to the present disclosure, such as a CPU (central processing unit), GPU (graphics processing unit), FPGA (field-programmable gate array), or the like. Moreover, a computer, a camera, a central board computer, a server, or the like may be configured as radar data determination circuitry.

In some embodiments, the radar data determination circuitry is configured to obtain image data. The image data may be obtained from a storage, from a processor, from a camera, or the like. The image data may be indicative of a color distribution of an environment, as it is generally known. Hence, the image data may be acquired with an RGB camera, for example, whereas also black and white camera, a two-color camera, a multispectral camera, or the like, may be envisaged.

Generally, the image data may be indicative of ambient light.

Moreover, in some embodiments, predictive radar data are determined from the image data. For example, an object being represented in the image data may be indicative of a predetermined radar signal, which may depend on a material/reflectivity of the object. For example, a car with a predetermined varnish/coating may have a different (radar) reflectivity than a car with a different varnish/coating.

Hence, the object in the image data may be representative for (radar) features. Such features are learned, in some embodiments, e.g., by an artificial intelligence or a machine learning algorithm in a supervised, semi-supervised or unsupervised way. For example, a plurality of image data and corresponding radar data may be used for training the artificial intelligence, such that a loss-function may be minimized, as it is generally known. In some embodiments, a ground truth may be envisaged for training, as it is generally known.

For example, color patterns may be learned to have a corresponding reflectivity, such that pixels in the camera plane may be excluded which are not expected to relate to a radar reflector. Hence, possible pixels in the camera plane may be narrowed down.

The features may correspond to radar detection points (areas) in an image (data) plane, as discussed herein.

Based on the predictive radar data, actual radar data may be determined. For example, radar measurement data may be available, which may have been obtained at roughly the same point of time as the image data, such that a time stamp of the radar measurement data may correspond to the a time stamp of the image data. However, the radar measurement data may include too much information on radar reflections, such that also irrelevant radar data points may be taken into account.

Hence, according to the present disclosure, the predictive radar data may be associated with the radar measurement data, such that irrelevant radar information may be removed from the radar measurement data.

The predictive radar data may be indicative of at least one of a feature probability and a predicted radar strength, in some embodiments. Hence, a signal intensity may be predicted and/or a probability that the prediction is correct may be determined.

The probability may be determined based on an uncertainty factor or certainty factor, which may be predetermined or learned, as well.

The predicted radar strength may depend on physical properties of the object/features, as discussed herein. However, according to the present disclosure, there is no need to exactly know intrinsic physical variables, as it may be sufficient to learn and thereby correlate the predicted radar strength with the image data.

For example, in an image frame, color patterns may be analyzed, and a map of predictive radar data points may be generated. The map may have a same size as the image frame or may be sub-sampled with respect to the image frame. In some embodiments, the map may be brought to a same size as a radar frame of the radar measurement data (i.e. also up-sampling or down-sampling may be envisaged).

The map may contain a plurality of grid-points, as it is generally known and each grid point may be indicative of the probability and/or the predicted radar strength.

In some embodiments, the learned features are learned based on at least one of: deep neural network, convolutional neural network, support vector machine, and random forest.

Also, other artificial intelligences or algorithms may be envisaged. Hence, the present disclosure is not limited to any particular learning algorithm and the learning may depend on the data which is available. That means, a particular algorithm may be used for a particular type of training, such as a convolutional neural network may be used for unsupervised training, or the like.

In some embodiments, further information may be extracted pixel-wise from the image data, e.g. based at least on one of the following:

- Semantic labeling/annotation of each pixel with a class label indicating an object class (e.g. car, pedestrian, manhole (cover), tire (in automotive examples, wherein the present disclosure is not limited to such embodiments))
- Instance level segmentation: e.g. pixel-wise semantic labelling plus an object instance ID
- 2D/3D object detection: e.g., providing a list of 2D or 3D bounding boxes of detected objects, e.g. including an object class label; 2D/3D position information; 3D object orientation; object ID
- Object Distance: e.g. based on object size
- Pixel-wise depth estimation: e.g. from single frame and/or structure-from-motion, e.g. based on a radial distance measurement
- Optical Flow: e.g. based on previous frames to determine apparent movement in an image plane, which may be indicative of an angular/radial velocity
- Change of object size (e.g. bounding box size): e.g., to determine an estimate of angular/radial velocity.

In some embodiments, the radar data determination circuitry is further configured to: determine a list of visually predicted radar detections (also referred to as radar predictions).

For example, the predictive radar data may be processed, such that the list may be determined including the predicted radar strength and/or the probability.

For example, the list may be determined based on a maximum detector applied on the predictive radar data.

The maximum detector may be configured to find maxima in the predicted radar strength and/or the probabilities, wherein a non-maxima suppression may be utilized, thereby generating a list of possible radar predictions in the image plane.

In some embodiments, the radar data determination circuitry is further configured to: annotate the visually predicted radar detections.

For example, each maximum may be associated with an uncertainty estimate (as discussed above), which may be a fixed value or which may be based on a curvature of a surrounding of each maximum.

Hence, in some embodiments, the uncertainty estimate is based on a curvature of a visually predicted radar detection of the list of visually predicted radar detections.

Each maximum may be associated with the further information discussed above, wherein the present disclosure is not limited to that case.

In some embodiments, the radar data determination circuitry is further configured to: obtain the radar measurement data; and annotate the radar measurement data.

Based on the radar measurement data, strong radar reflection points may be determined, which may be indicative of at least one of coordinates in a radar plane (including at least one of radial position, horizontal angle and vertical angle), a detection strength, and a radial velocity.

Such actual radar detections may be annotated, wherein the present disclosure is not limited to that case. Annotation of actual radar detections may be based on an association of the actual radar detections with an object class label, e.g. based on micro-Doppler analysis.

In some embodiments, the radar data determination circuitry is further configured to: associate the predictive radar data with the radar measurement data based on a domain transform of at least one of the predictive radar data and the radar measurement data; and determine a difference between the predictive radar data and the radar measurement data for determining the actual radar data.

For example, the actual radar detections may be transferred into the image plane, wherein it may be assumed that a relative position and orientation of the camera and the radar as well as their internal characteristics may be known (e.g. determined based on a calibration).

Based on that, the actual radar positions and uncertainties (taking into account error propagation(s), as it is generally known) may be transferred into a camera coordinate system and thus projected to the image plane, such that the actual radar detections and the radar predictions are present in the same domain.

Between each actual radar detection and radar prediction, a distance value may be determined. A low distance may indicate a correspondence between a radar prediction and an actual radar detection, which may be indicative of a high probability that the actual radar detection belongs to a visually predicted position. A high distance may indicate a low probability.

The distance may include at least one of the following:

- Distance of the positions in the camera plane including uncertainties (e.g. based on Mahalanobis distance)
- Difference between actual and predicted reflection strength
- Difference between radial distance of the feature measured by the radar (taking into account ambiguity (i.e. Nyquist distance)) and predicted radial distance of the object
- Contradiction in semantic class label provided by radar and/or camera
- Contradiction in the radar-measured radial speed and a predicted speed
- Contradiction in the radar-measured radial speed (compensated for ego-motion) and a visual object class (e.g. a fast moving object should not be associated with an object class which is static (e.g. traffic sign, building) or has a low speed (e.g. pedestrian)

Thereby, pair-wise distances may be determined and may be arranged (symbolically) as a table. Moreover, in some embodiments, a distance value may be defined below which the detections may not be associated.

In some embodiments, an association between the predictive radar data and the radar measurement data may be determined based on the pair-wise distances (e.g. based on an association distance table).

For example, an algorithm (e.g. nearest-neighbor algorithm, Hungarian algorithm, or the like) may be applied for finding associations (possibly allowing some distances to be unassociated), wherein an association quality may be determined based on the determined distances (e.g., the lower the distance the higher the association quality, without limiting the present disclosure in that regard), wherein a total distance (e.g., a sum over all distances) may be predefined to lie below a predetermined threshold.

In some embodiments, the associated distances may be fused/merged/combined.

For example, at least one of the following may be carried out:

- Fusion of a radial position with a visual angular position from the image data (e.g. derived from pixel position and camera geometry) to a 3D position
- Fusion of radar radial speed and visual angular speed (e.g. derived from optical flow and camera geometry) to a 3D velocity
- Resolving of radar radial speed ambiguity (e.g. based on Nyquist-Shannon theorem) based on an "imprecise" visual radial speed (change)
- Fusion of semantic object class label from camera and radar to a joint semantic label
- Using a visual instance ID Based on the above data-processing, a list of detections may be obtained which may be indicative of information fused from camera and radar being more precise and richer than detections of only one data source.

Non-associated detections may be discarded or kept and marked as not fused, for example.

The present disclosure is not limited to any technical field and although the following embodiments which are described in the figures will be focused on an automotive environment, it should be understood that the present disclosure may be applied in any case in which radar and camera data may be fused (e.g. to understand an environment), such as land-based, marine, or airborne navigation, e.g. for advanced driver assistance systems in cars, autonomous vehicles, robots, boats, ships, UAVs (unpiloted aerial vehicles), or the like.

Moreover, the present disclosure is not limited to radar. For example, lidar may be envisaged in some embodiments, or any other wave-detection-based method for determining a distance, such as ultrasound-based distance measurements, or the like.

Some embodiments pertain to a radar data determination method, including: obtaining image data; and determining predictive radar data from the image data based on learned features being represented in the image data, for determining actual radar data based on an association of the predictive radar data with radar measurement data, as discussed herein, which may be carried out with radar data determination circuitry according to the present disclosure, for example.

In some embodiments, the predictive radar data are indicative of at least one of a feature probability and a predicted radar strength, as discussed herein. In some embodiments, the learned features are learned based on at least one of: deep neural network, convolutional neural network, support vector machine, and random forest, as discussed herein. In some embodiments, the radar data determination method further includes: determining a list of visually predicted radar detections, as discussed herein. In some embodiments, the list is determined based on a maximum detector applied on the predictive radar data, as discussed herein. In some embodiments, the radar data determination method further includes: annotating the visually predicted radar detections, as discussed herein. In some embodiments, the visually predicted radar detections are annotated based on an association with an uncertainty estimate, as discussed herein. In some embodiments, the uncertainty estimate is based on a curvature of a visually predicted radar detection of the list of visually predicted radar detections, as discussed herein. In some embodiments, the radar data determination method further includes: obtaining the radar measurement data; and annotating the radar measurement data, as discussed herein. In some embodiments, the radar data determination method further includes: associating the predictive radar data with the radar measurement data based on a domain transform of at least one of the predictive radar data and the radar measurement data; and determining a difference between the predictive radar data and the radar measurement data for determining the actual radar data, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Some explanatory embodiments of an application of the present disclosure are given in the following:

For example, the present disclosure may be applied on a motorway with two lanes. A radar may identify an object in front with a (roughly) precise distance and radial speed and the camera may identify the object as a car with a (roughly) precise horizontal position, such that a used lane may be identified. An imprecise change of a distance estimation of the camera may allow to resolve a periodic ambiguity of the radar velocity.

In a further exemplary embodiment, the camera may provide the radar with a detection position being (roughly) precise in a vertical direction to distinguish between obstacles (e.g. car, pedestrian, guard rail, or the like) from objects with sufficient overhead clearance (e.g. traffic sign, traffic light, bridge, or the like).

In a further exemplary embodiment, the camera may provide a semantic label to distinguish radar detections of a dangerous obstacle of the road (e.g. tire) from a non-dangerous traversable structure (e.g. manhole cover).

In a further exemplary embodiment, the camera may provide a semantic label to identify a radar reflection with zero radial speed (e.g. with respect to a world coordinate system), such as a car or truck moving left to right (and not radially).

In a further exemplary embodiment, the camera may provide an object instance identification to distinguish radar detections received from two cars with similar speed, e.g., on two lanes of a motorway.

In a further exemplary embodiment, the camera may provide a semantic class label and orientation to identify radar detections as a pedestrian, and to predict a movement of the pedestrian.

In a further exemplary embodiment, a camera pixel position and optical flow may be fused with a radar radial position and radial velocity such that a 3D position and 3D velocity may be determined.

Hence, according to the present disclosure, existing algorithms may be kept and used for detecting objects based on radar and camera data. However, measurements may be refined at an early stage of a processing pipeline, such that each sensor may benefit from the complementary strengths of the other sensor before most of the processing is performed.

Returning to FIG. 1, there is shown a schematic illustration of radar data determination circuitry 1 according to the present disclosure. The radar data determination circuitry 1 includes a camera 2 for obtaining image data of and a radar 3 for obtaining radar measurement data, as discussed herein, for a car 4.

A processor (not shown) is configured to determine predictive radar data from the image data, as discussed herein, such that a difference between the predictive radar data and the radar measurement data can be determined, as discussed herein.

Figure 2:
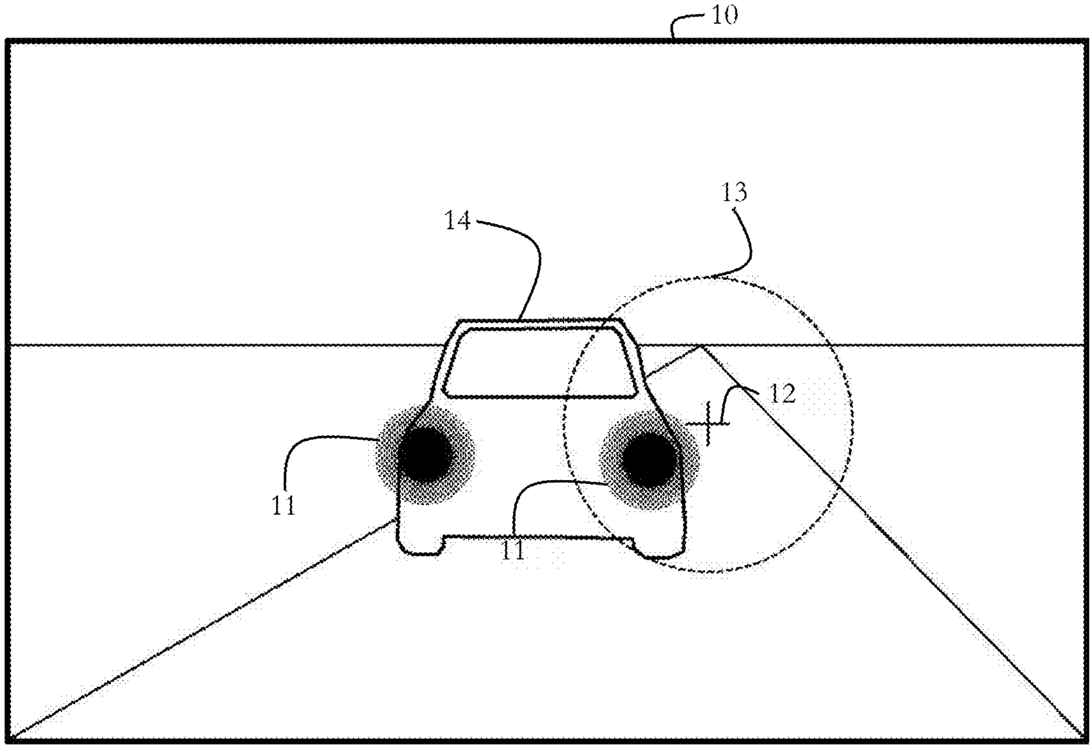
FIG. 2 depicts an image as recorded with the camera of the radar data determination circuitry of FIG. 1, wherein radar elements are overlaid on the image data.

FIG. 2 depicts an image 10 as recorded with the camera 2 with predicted radar reflections 11 overlaid on the image. Furthermore, an actual radar reflection 12 projected into the camera plane and a measurement uncertainty 13 is shown. In FIG. 2, the predicted radar reflections 11 surround lights of a car 14 and the actual radar reflection 12 is on the right of the car 14, wherein the uncertainty 13 covers a right part of the car. Hence, based on the predicted radar reflections 11, and the actual radar reflection 12, a resulting radar reflection can be determined, as discussed herein.

Figure 3:
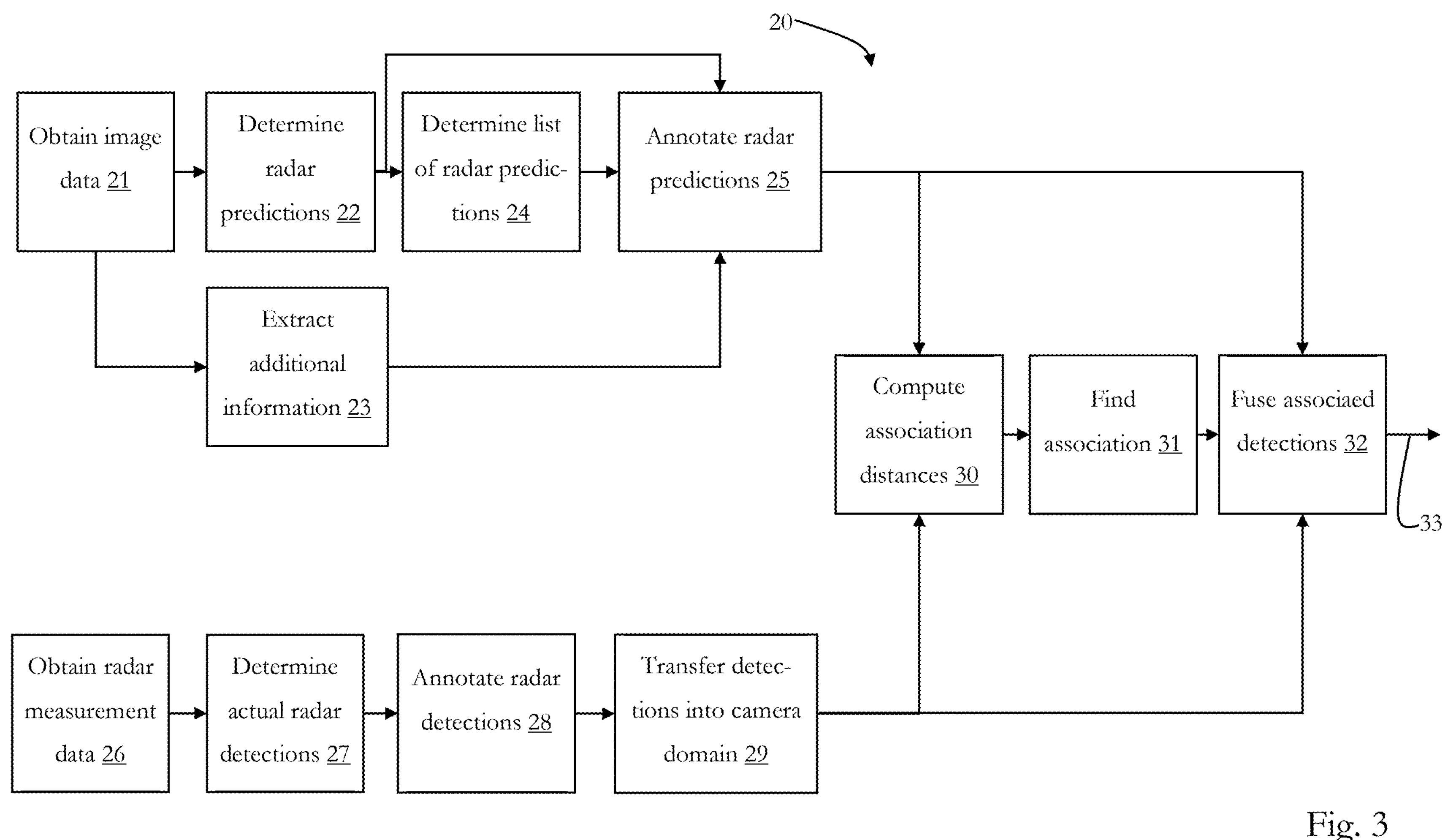
FIG. 3 depicts a radar data determination method according to the present disclosure in a block diagram.

FIG. 3 depicts a radar data determination method 20 according to the present disclosure in a block diagram, which is further discussed under reference of FIGS. 4*a* to 4*f*.

Figure 4A:
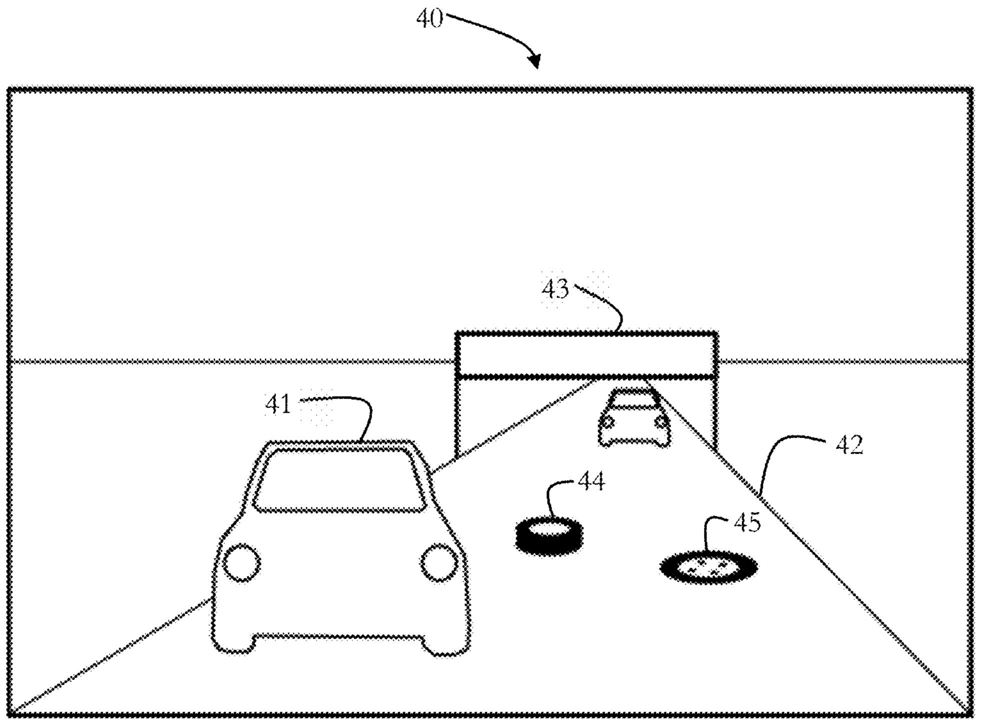
FIGS. 4*a* to 4*f* are examples for further describing the radar data determination method of FIG. 3.

At 21, image data are obtained from a camera, as discussed herein. Accordingly, FIG. 4*a* depicts a scene 40 which is represented by the image data. The scene includes two cars 41 on a road 42, wherein a street sign 43, a car tire 44, and a manhole cover 45 are further depicted.

Figure 4B:
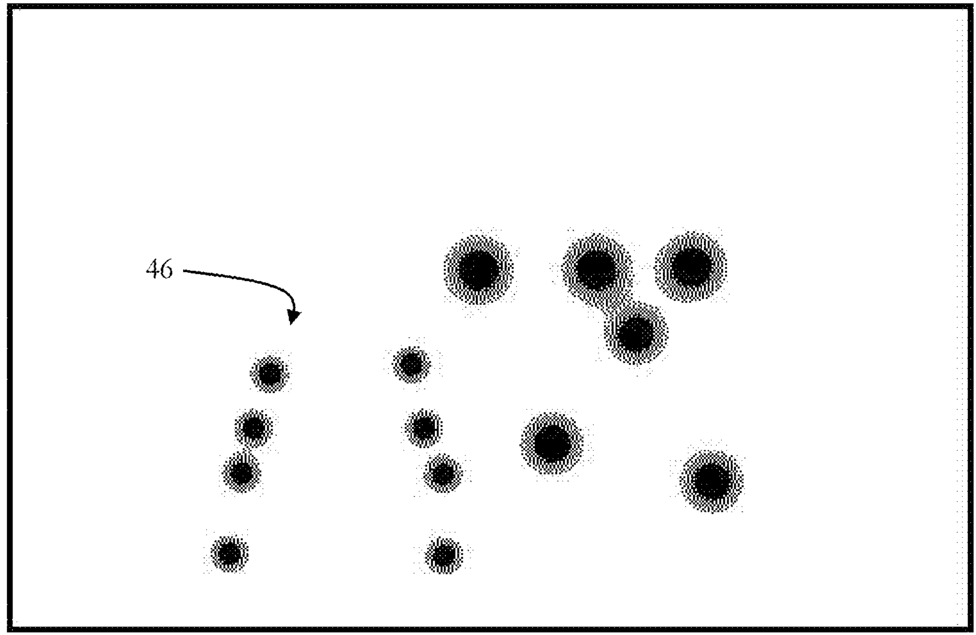
Figure 4C:
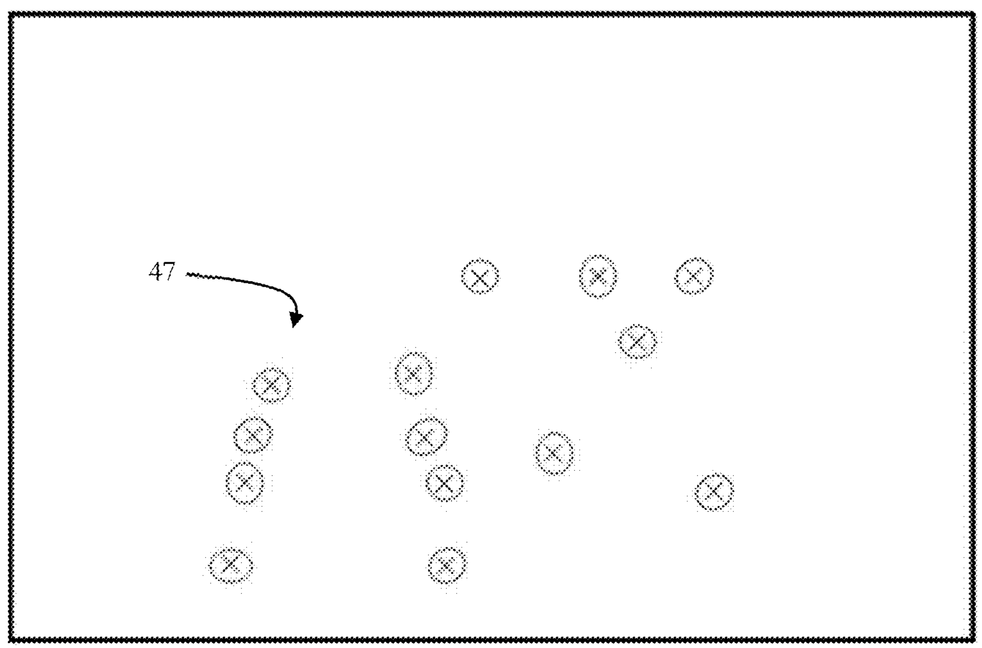

At 22, radar predictions are determined based on learned features, as discussed herein, and as shown in FIG. 4*b* depicting a plurality of radar signals 46 predicted from the image 40. FIG. 4*c* depicts a further representation of radar predictions 47 by means of a cross with an ellipse representing a prediction uncertainty.

Figure 4D:
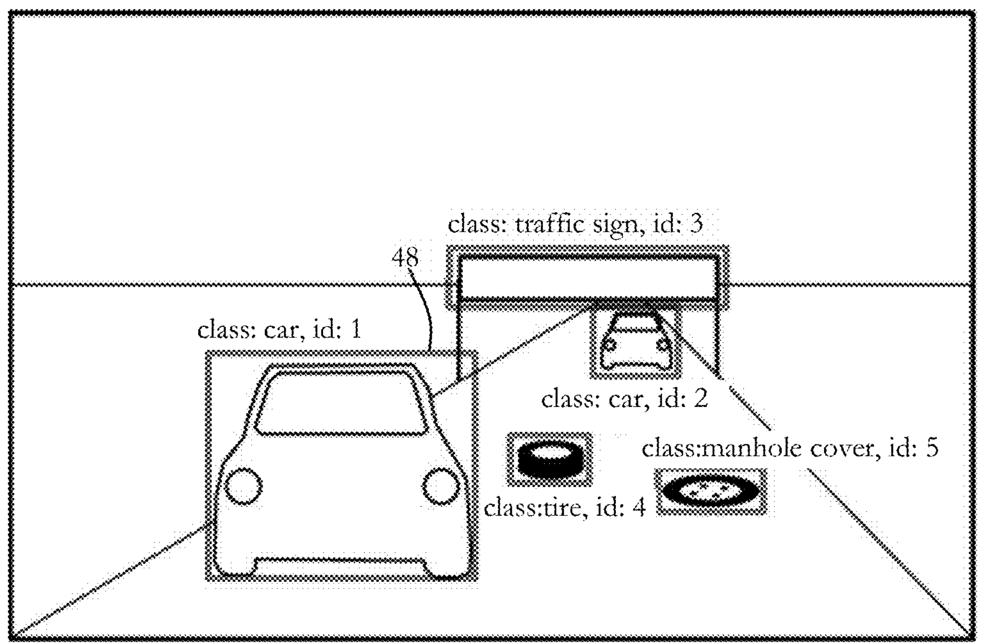

At 23, additional information are extracted from the image data, as discussed herein (e.g. semantic labeling, instance level segmentation, and so on). The additional information is depicted in FIG. 4*d*, in which bounding boxes 48 are shown for each recognized element. Furthermore, object classes and object IDs are assigned to each bounding box 48.

At 24, a list of radar predictions is determined, as discussed herein.

At 25, based on the additional information, the radar predictions are annotated, as discussed herein.

At 26, radar measurement data is obtained from a radar, as discussed herein.

At 27, actual radar detections are determined from the radar measurement data, which are annotated, at 28, and which are transferred into the camera domain, at 29, as discussed herein.

At 30, association distances are computed/determined, as discussed herein.

Figure 4E:
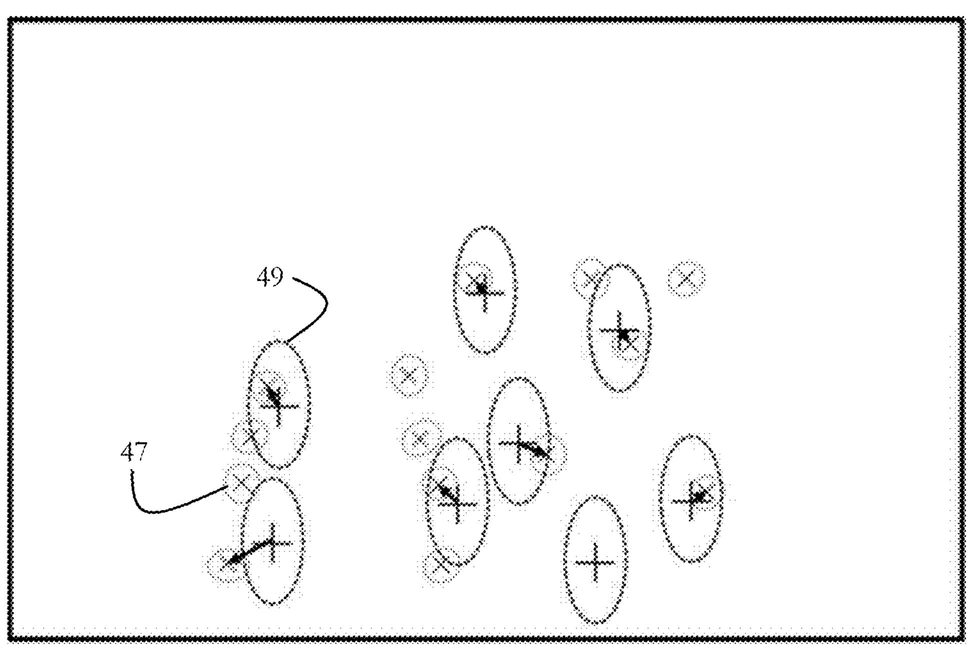
Figure 4F:
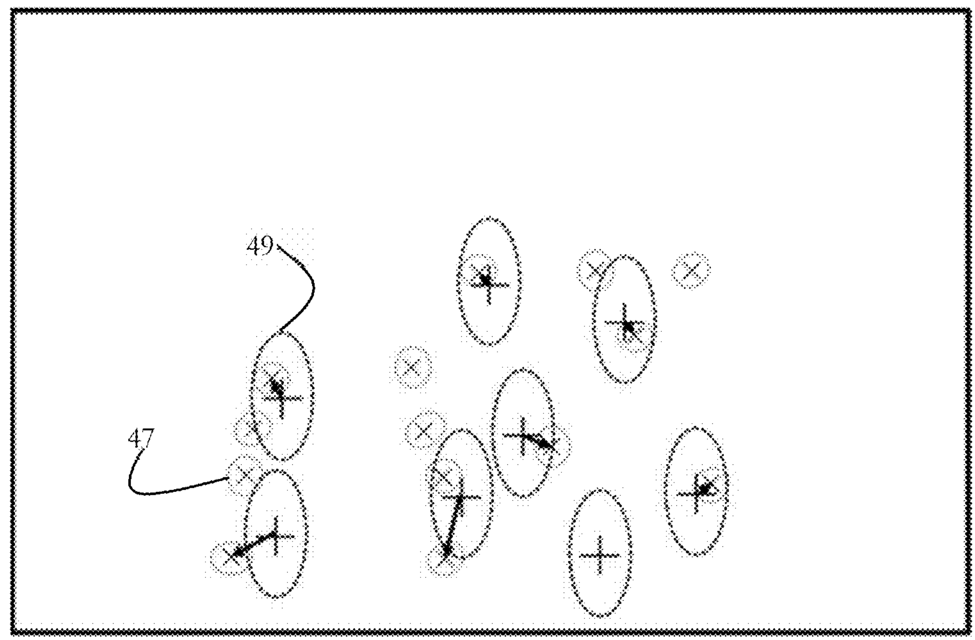

FIGS. 4*e* and 4*f* show two different possibilities of how the association distances are determined. The radar predictions 47 are connected to actual radar detections 49 with arrows which symbolically show the herein discussed difference/distance between the predictions 47 and the detections 49.

However, some predictions 47 and detections 49 remain unassociated and are, thus, discarded (however, as discussed herein, in some embodiments, the unassociated detections may be kept and flagged as not fused).

At 31, associations between the predictions and the detections are found/determined based on the association distances, as discussed herein.

At 32, associated detections are fused, as discussed herein.

At 33, the data is input to a processing pipeline, which may be a known processing pipeline or a processing pipeline specifically designed for processing associated detections. The object classes are car, tire, manhole cover and traffic sign.

Figure 5:
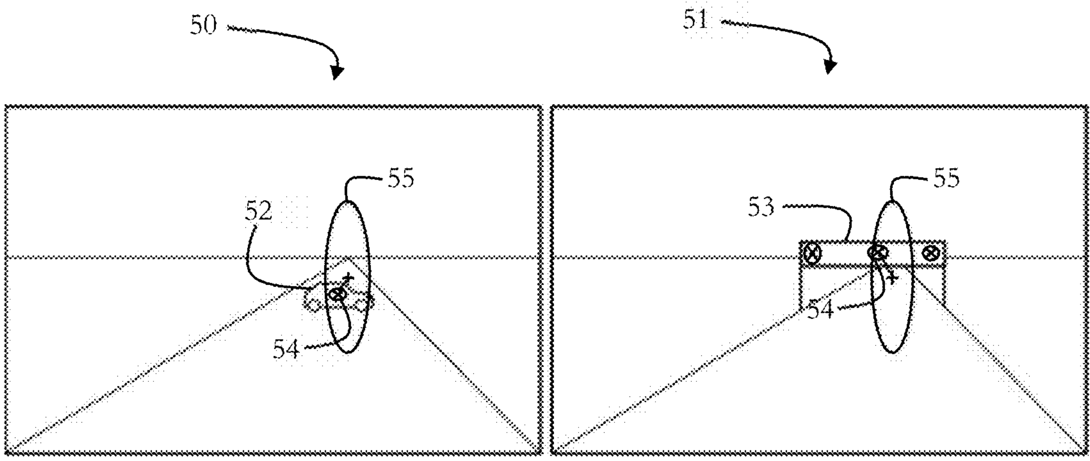
FIG. 5 shows an exemplary embodiment in which a car is distinguished from a street sign due to the application of the present disclosure.

FIG. 5 shows an exemplary embodiment in which a car is distinguished from a street sign due to the application of the present disclosure. FIG. 5 depicts two scenes 50 and 51. In the scene 50, a car 52 is shown which is positioned orthogonal to a driving direction. In the scene 51, a street sign 53 is shown. Both the car 52 and the street sign 53 have no radial speed after ego-motion compensation. Moreover, radar predictions 54 and actual radar detections 55 are shown in the scenes 50 and 51.

The actual radar detections 55 are roughly the same for the scene 50 and 51. Hence, by only relying on the actual radar detections, it could not be distinguished whether there is a dangerous obstacle on the street (car 52) or the obstacle can be passed (street sign 53).

However, based on the radar predictions 54, the actual radar detections 55 can be associated with the radar predictions, such that a vertical position of the respective objects can be determined, such that in the case of scene 50, a warning can be triggered since a danger of the situation is recognized, whereas in the scene 51, it can be determined that the street sign 53 has enough overhead clearance, such that no warning is triggered.

Figure 6:
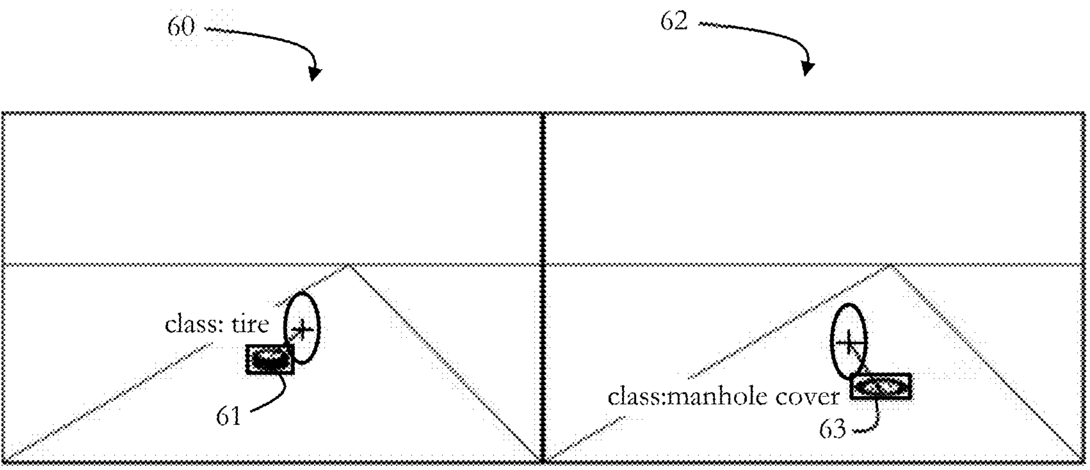
FIG. 6 shows a further exemplary embodiment in which a tire is distinguished from a manhole cover.

FIG. 6 shows a further exemplary embodiment in which a tire lying on a street is distinguished from a manhole cover. A scene 60 including a tire 61 is shown on the left of FIG. 6 and a scene 62 including a manhole cover 63 is shown on the right of FIG. 6. After an association of predicted radar detections with actual radar detections, it could not be determined whether there is a dangerous situation or not (the tire 61 represents a dangerous situation and the manhole cover represents a non-dangerous situation).

However, according to the present disclosure, the image data are semantically labelled, such that object classes are associated with the respective objects. Hence, in the scene 60, it can be determined that there is a dangerous situation and, in scene 62, there is not, since the manhole cover 63 is traversable.

Figure 7:
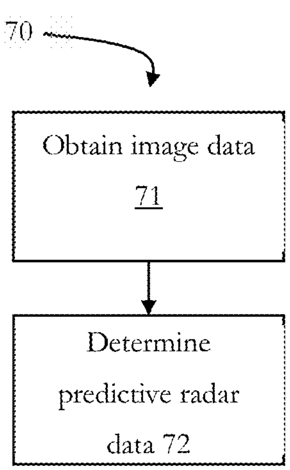
FIG. 7 depicts an embodiment of a radar data determination method according to the present disclosure in a block diagram.

FIG. 7 depicts an embodiment of a radar data determination method 70 according to the present disclosure in a block diagram.

At 71, image data are obtained, as discussed herein.

At 72, predictive radar data are determined from the image data based on learned features being represented in the image data, for determining actual radar data based on an association of the predictive radar data with radar measurement data, as discussed herein.

Figure 8:
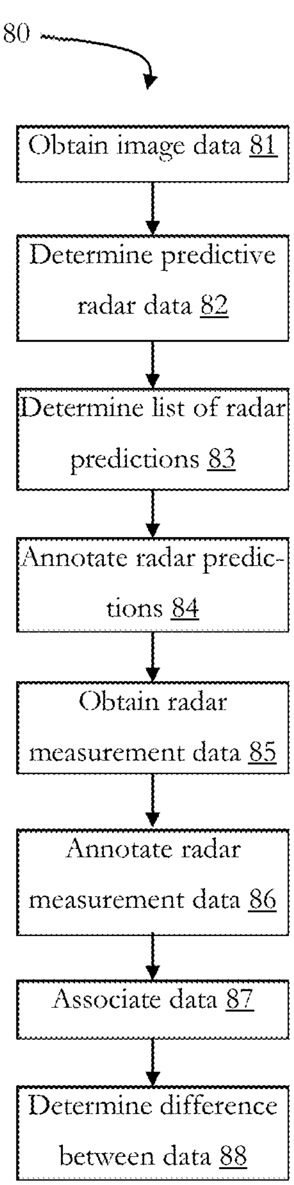
FIG. 8 depicts a further embodiment of a radar data determination method according to the present disclosure in a block diagram wherein the obtained data is further processed.

FIG. 8 depicts a further embodiment of a radar data determination method 80 according to the present disclosure in a block diagram, wherein, in contrast to the method 70 of FIG. 7, the data is further processed.

At 81, image data is obtained, as discussed herein.

At 82, predictive radar data are determined from the image data based on learned features being represented in the image data, for determining actual radar data based on an association of the predictive radar data with radar measurement data, as discussed herein.

At 83, a list of radar predictions is determined, as discussed herein.

At 84, the radar predictions are annotated as discussed herein.

At 85, radar measurement data are obtained, as discussed herein, which are annotated at 86.

At 87, the radar measurement data and the predictive radar data are associated, as discussed herein, namely in that radar predictions and actual radar detections are associated.

At 88, a difference between the radar measurement data and the predictive radar data is determined, as discussed herein. The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 9:
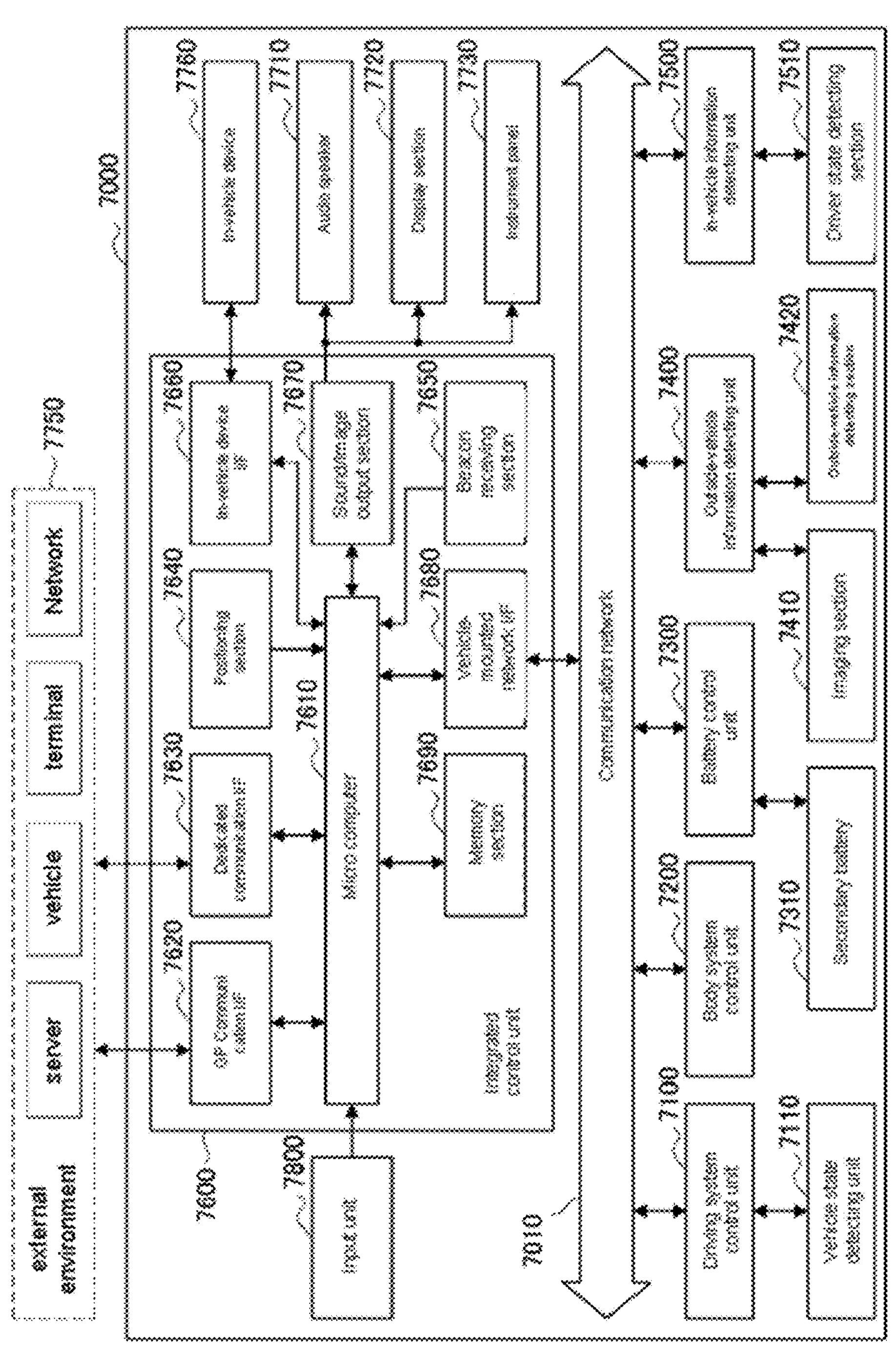
FIG. 9 is a block diagram depicting an example of schematic configuration of a vehicle control system.

FIG. 9 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 9, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 9 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device or may be provided as a device in which a plurality of sensors or devices are integrated.

Figure 10:
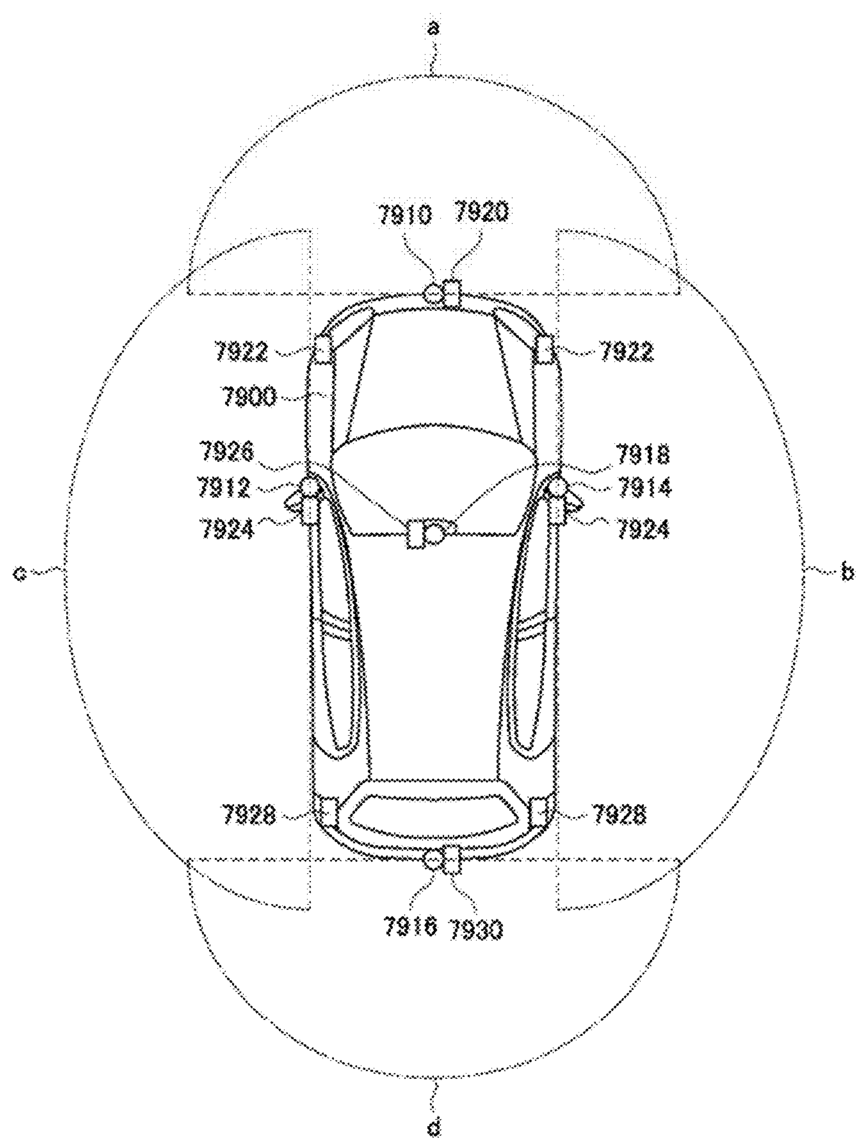
FIG. 10 is a diagram of assistance in explaining an example of installation positions of an outside-vehicle information detecting section and an imaging section.

FIG. 10 depicts an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 10 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 9, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle.

The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 9, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 9 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the present disclosure can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the functions of the present disclosure can be applied to the integrated control unit 7600 in the application example depicted in FIG. 9. For example, the SS section 102, the TT section 104, and the UU section 106 of the information processing device 100 respectively correspond to the microcomputer 7610, the storage section 7690, and the vehicle-mounted network I/F 7680 of the integrated control unit 7600.

In addition, at least parts of the functionalities of the present disclosure may be implemented in a module (for example, an integrated circuit module formed with a single die) for the integrated control unit 7600 depicted in FIG. 9. Alternatively, the functions of the present disclosure may be realized by a plurality of control units of the vehicle control system 7000 depicted in FIG. 9.

It should be recognized that the embodiments describe methods with an exemplary ordering of method steps. The specific ordering of method steps is however given for illustrative purposes only and should not be construed as binding. For example the ordering of 21 and 26 in the embodiment of FIG. 3 may be exchanged. Also, the ordering of 22 and 23 in the embodiment of FIG. 3 may be exchanged. Further, also the ordering of 81 to 84 and 85 to 86 in the embodiment of FIG. 8 may be exchanged. Other changes of the ordering of method steps may be apparent to the skilled person.

In some embodiments, also a non-transitory computer-readable recording medium is provided that stores therein a computer program product, which, when executed by a processor, such as the processor described above, causes the method(s) described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Radar data determination circuitry, configured to:

obtain image data; and determine predictive radar data from the image data based on learned features being represented in the image data, for determining actual radar data based on an association of the predictive radar data with radar measurement data.

(2) The radar data determination circuitry (1), wherein the predictive radar data are indicative of at least one of a feature probability and a predicted radar strength.

(3) The radar data determination circuitry (1) or (2), wherein the learned features are learned based on at least one of: deep neural network, convolutional neural network, support vector machine, and random forest.

(4) The radar data determination circuitry of anyone of (1) to (3), further configured to:

determine a list of visually predicted radar detections.

(5) The radar data determination circuitry of (4), wherein the list is determined based on a maxima detector applied on the predictive radar data.

(6) The radar data determination circuitry of (4) or (5), further configured to:

annotate the visually predicted radar detections.

(7) The radar data determination circuitry of (6), wherein the visually predicted radar detections are annotated based on an association with an uncertainty estimate.

(8) The radar data determination circuitry of (7), wherein the uncertainty estimate is based on a curvature of a visually predicted radar detection of the list of visually predicted radar detections.

(9) The radar data determination circuitry of anyone of (6) to (8), further configured to:

obtain the radar measurement data; and annotate the radar measurement data.

(10) The radar data determination circuitry of (9), further configured to:

associate the predictive radar data with the radar measurement data based on a domain transform of at least one of the predictive radar data and the radar measurement data; and determine a difference between the predictive radar data and the radar measurement data for determining the actual radar data.

(11) A radar data determination method, comprising:

obtaining image data; and determining predictive radar data from the image data based on learned features being represented in the image data, for determining actual radar data based on an association of the predictive radar data with radar measurement data.

(12) The radar data determination method of (11), wherein the predictive radar data are indicative of at least one of a feature probability and a predicted radar strength.

(13) The radar data determination method of (11) or (12), wherein the learned features are learned based on at least one of: deep neural network, convolutional neural network, support vector machine, and random forest.

(14) The radar data determination method of anyone of (11) to (13), further comprising:

determining a list of visually predicted radar detections.

(15) The radar data determination method of (14), wherein the list is determined based on a maximum detector applied on the predictive radar data.

(16) The radar data determination method of (14) or (15), further comprising:

annotating the visually predicted radar detections.

(17) The radar data determination method of (16), wherein the visually predicted radar detections are annotated based on an association with an uncertainty estimate.

(18) The radar data determination method of (17), wherein the uncertainty estimate is based on a curvature of a visually predicted radar detection of the list of visually predicted radar detections.

(19) The radar data determination method of anyone of (16) to (18), further comprising:

obtaining the radar measurement data; and annotating the radar measurement data.

(20) The radar data determination method of (19), further comprising:

associating the predictive radar data with the radar measurement data based on a domain transform of at least one of the predictive radar data and the radar measurement data; and determining a difference between the predictive radar data and the radar measurement data for determining the actual radar data.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Radar data determination circuitry, configured to:

obtain optical image data at a particular time;

obtain radar measurement data having a time stamp corresponding to the particular time;

determine predictive radar data from the optical image data obtained at the particular time based on learned features correlating optical characteristics represented in the optical image data obtained at the particular time to radar characteristics;

associate the predictive radar data determined from the optical image data obtained at the particular time with the radar measurement data having the time stamp corresponding to the particular time; and determine actual radar data by removing radar information from the radar measurement data having the time stamp corresponding to the particular time based on the association of the predictive radar data determined from the optical image data obtained at the particular time with the radar measurement data having the time stamp corresponding to the particular time.

2. The radar data determination circuitry of claim 1, wherein the predictive radar data determined from the optical image data obtained at the particular time is indicative of at least one of a feature probability or a predicted radar strength.

3. The radar data determination circuitry of claim 1, wherein the learned features are learned based on at least one of: a deep neural network, a convolutional neural network, a support vector machine, or a random forest.

4. The radar data determination circuitry of claim 1, wherein determining the predictive radar data from the optical image data obtained at the particular time includes determining a list of visually predicted radar detections.

5. The radar data determination circuitry of claim 4, wherein the list is determined by detecting maximums in the predictive radar data determined from the optical image data obtained at the particular time.

6. The radar data determination circuitry of claim 4, further configured to:

annotate the visually predicted radar detections.

7. The radar data determination circuitry of claim 6, wherein the visually predicted radar detections are annotated based on an association with an uncertainty estimate.

8. The radar data determination circuitry of claim 7, wherein the uncertainty estimate is based on a curvature of a surrounding of each maximum of the visually predicted radar detections of the list of visually predicted radar detections.

9. The radar data determination circuitry of claim 6, further configured to:

annotate the radar measurement data having the time stamp corresponding to the particular time.

10. The radar data determination circuitry of claim 9, further configured to:

associate the predictive radar data determined from the optical image data obtained at the particular time with the radar measurement data having the time stamp corresponding to the particular time based on a domain transform of at least one of the predictive radar data determined from the optical image data obtained at the particular time and the radar measurement data having the time stamp corresponding to the particular time; and determine a difference between the predictive radar data determined from the optical image data obtained at the particular time and the radar measurement data having the time stamp corresponding to the particular time for determining the actual radar data.

11. A radar data determination method, comprising:

obtaining optical image data at a particular time;

obtaining radar measurement data having a time stamp corresponding to the particular time;

determining predictive radar data from the optical image data obtained at the particular time based on learned features correlating optical characteristics represented in the optical image data obtained at the particular time to radar characteristics;

associating the predictive radar data determined from the optical image data obtained at the particular time with the radar measurement data having the time stamp corresponding to the particular time; and determining actual radar data by removing radar information from the radar measurement data having the time stamp corresponding to the particular time based on the association of the predictive radar data determined from the optical image data obtained at the particular time with the radar measurement data having the time stamp corresponding to the particular time.

12. The radar data determination method of claim 11, wherein the predictive radar data determined from the optical image data obtained at the particular time is indicative of at least one of a feature probability or a predicted radar strength.

13. The radar data determination method of claim 11, wherein the learned features are learned based on at least one of: a deep neural network, a convolutional neural network, a support vector machine, or a random forest.

14. The radar data determination method of claim 11, wherein determining the predictive radar data from the optical image data obtained at the particular time includes determining a list of visually predicted radar detections.

15. The radar data determination method of claim 14, wherein the list is determined by detecting maximums in the predictive radar data determined from the optical image data obtained at the particular time.

16. The radar data determination method of claim 14, further comprising:

annotating the visually predicted radar detections.

17. The radar data determination method of claim 16, wherein the visually predicted radar detections are annotated based on an association with an uncertainty estimate.

18. The radar data determination method of claim 17, wherein the uncertainty estimate is based on a curvature of a surrounding of each maximum of the visually predicted radar detections of the list of visually predicted radar detections.

19. The radar data determination method of claim 16, further comprising:

annotating the radar measurement data having the time stamp corresponding to the particular time.

20. The radar data determination method of claim 19, further comprising:

associating the predictive radar data determined from the optical image data obtained at the particular time with the radar measurement data having the time stamp corresponding to the particular time based on a domain transform of at least one of the predictive radar data determined from the optical image data obtained at the particular time and the radar measurement data having the time stamp corresponding to the particular time; and determining a difference between the predictive radar data determined from the optical image data obtained at the particular time and the radar measurement data having the time stamp corresponding to the particular time for determining the actual radar data.

* * * * *